(12) United States Patent
Rule et al.

(10) Patent No.: US 7,864,394 B1
(45) Date of Patent: Jan. 4, 2011

(54) DYNAMICALLY VARIABLE METAMATERIAL LENS AND METHOD

(75) Inventors: Donald W. Rule, Silver Spring, MD (US); Kevin A. Boulais, Waldorf, MD (US); Francisco Santiago, Fredericksburg, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 105 days.

(21) Appl. No.: 12/420,840

(22) Filed: Apr. 9, 2009

Related U.S. Application Data

(63) Continuation-in-part of application No. 11/504,859, filed on Aug. 16, 2006, now Pat. No. 7,525,711.

(60) Provisional application No. 60/713,615, filed on Aug. 31, 2005.

(51) Int. Cl.
*G02F 1/03* (2006.01)
(52) U.S. Cl. ...................... 359/244; 359/241
(58) Field of Classification Search ............... 359/244, 359/241, 240; 333/220, 221, 235
See application file for complete search history.

(56) References Cited

U.S. PATENT DOCUMENTS

| 7,405,866 B2 | 7/2008 | Kuekes et al. | |
| 7,525,711 B1 * | 4/2009 | Rule et al. | 359/244 |
| 7,746,538 B2 * | 6/2010 | Ishii | 359/290 |

OTHER PUBLICATIONS

Eugene Hecht, Optics, 2nd Edition, p. 136, Figure 5.14 (Addison-Wesley, Reading, MA, 1988).

C. G. Parazzoli et al., Applied Physics Letters 84, 3232-3234, Fig. 1. (2004).
R. B. Greegor et al., Applied Physics Letters 87, 091114, Fig. 1. (2005).
T. Driscoll et al., Applied Physics Letters 88, 081101, Fig. 1. (2006).
A.F. Starr et al., Physical Review B 70, 113102 (2004).
K.A. Boulais et al., Tunable split-ring resonators for metamaterials using photocapacitance of semi-insulating GaAs, Appl. Phys. Lett. 93, 043518 (2008).
B.G. Streetman et al. List of band gaps, Solid State Electronic Devices, 5th edition, PrenticeHall, New Jersey (2000), 524.
R.G. Lerner and G.L. Trigg, Concise Encyclopedia of Solid State Physics, Addison-Wesley Publishing Co., Inc. (1983) pp. 75-77.
J. Lagowski, D.G. Lin, T.P. Chen, M. Skowronski and H.C. Gatos, "Native hole traps in bulk GaAs and its association with the double-charge state of the arsenic antisite defect", Appl. Phys. Lett. 47, pp. 929-931 (1985).

(Continued)

*Primary Examiner*—Timothy J Thompson
(74) *Attorney, Agent, or Firm*—Richard A. Morgan

(57) ABSTRACT

A dynamically variable lens is made from actively tunable electromagnetic metamaterial cells. The lens operates on electromagnetic radiation including: radio frequency waves, microwaves, teraherz waves, near infrared waves, infrared waves and visible waves. The focal length of the lens is changed at a selected frequency. In the alternative, the frequency of radiation operated on is changed as a function of time. A third alternative provides precise control of the index of refraction of the lens. The index of refraction is varied progressively across the lens from one edge to the opposite edge causing the radiation to be directed at an angle.

27 Claims, 8 Drawing Sheets

OTHER PUBLICATIONS

P. Omling, P. Silverberg and L. Samuelson, "Identification of a second energy level of EL2 in n-type GaAs", Phys. Rev. B38, pp. 3606-3609 (1988).

D.C. Look and Z.Q. Fang, "On the energy level of EL2 in GaAs", Solid-State Electronics 43 (1999), pp. 1317-1319.

* cited by examiner

FIG. 2a
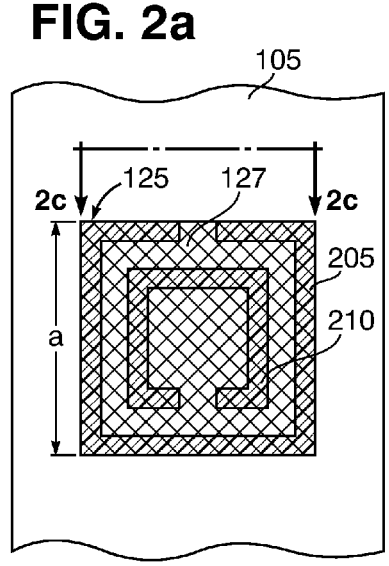
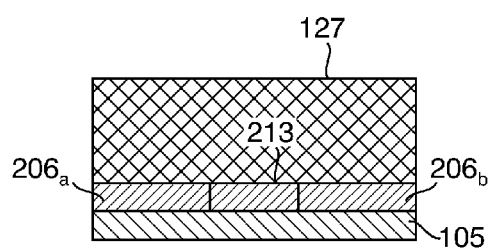
FIG. 2c
FIG. 2b
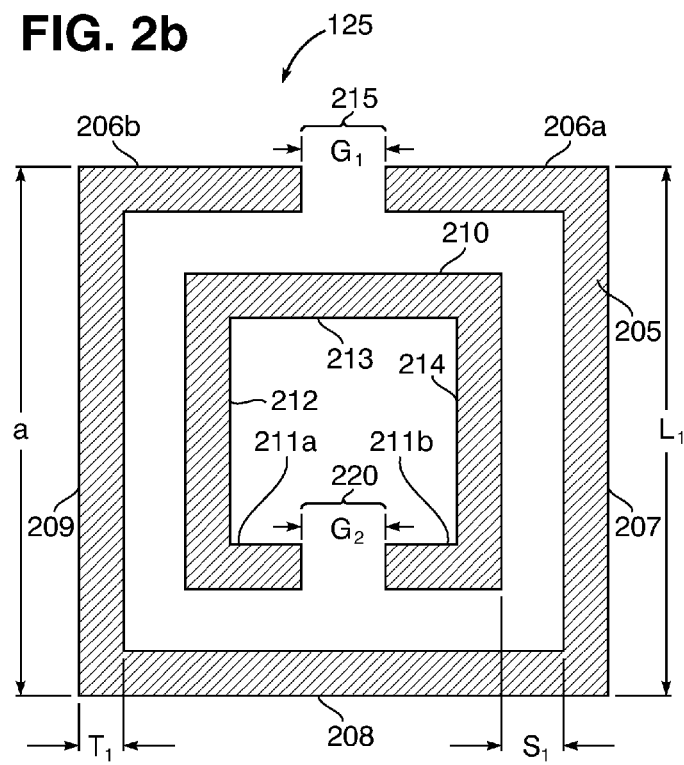

FIG. 3a
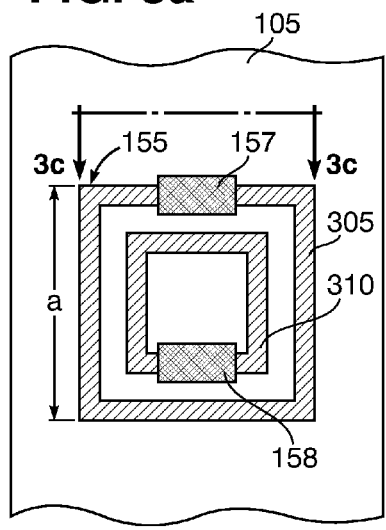
FIG. 3c
FIG. 3b
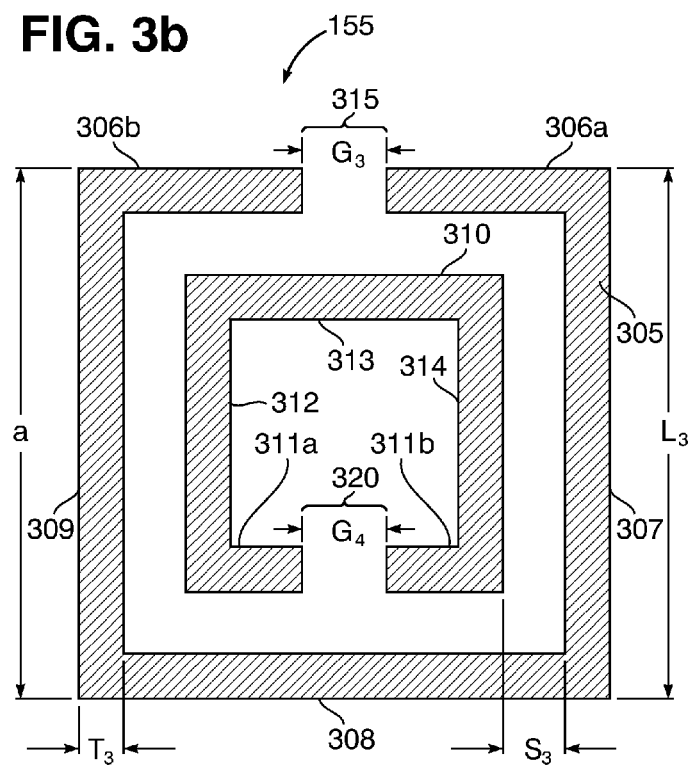

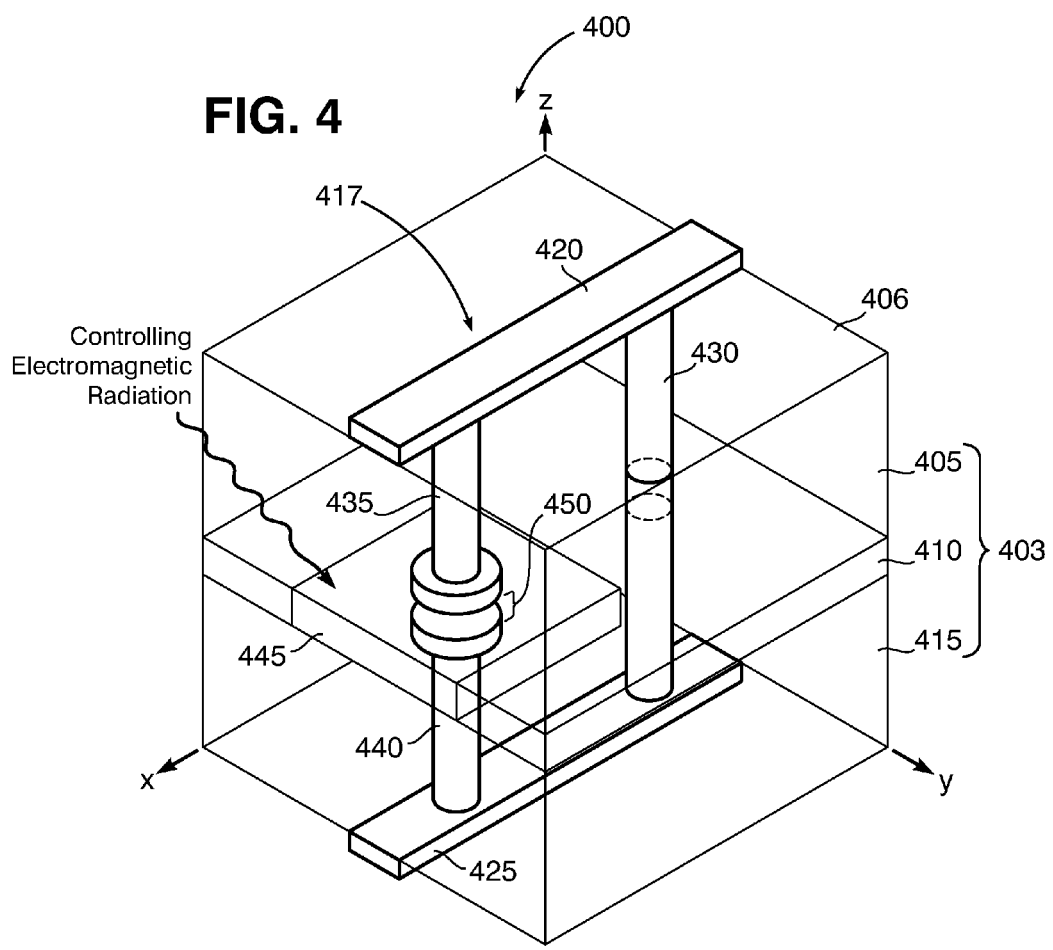

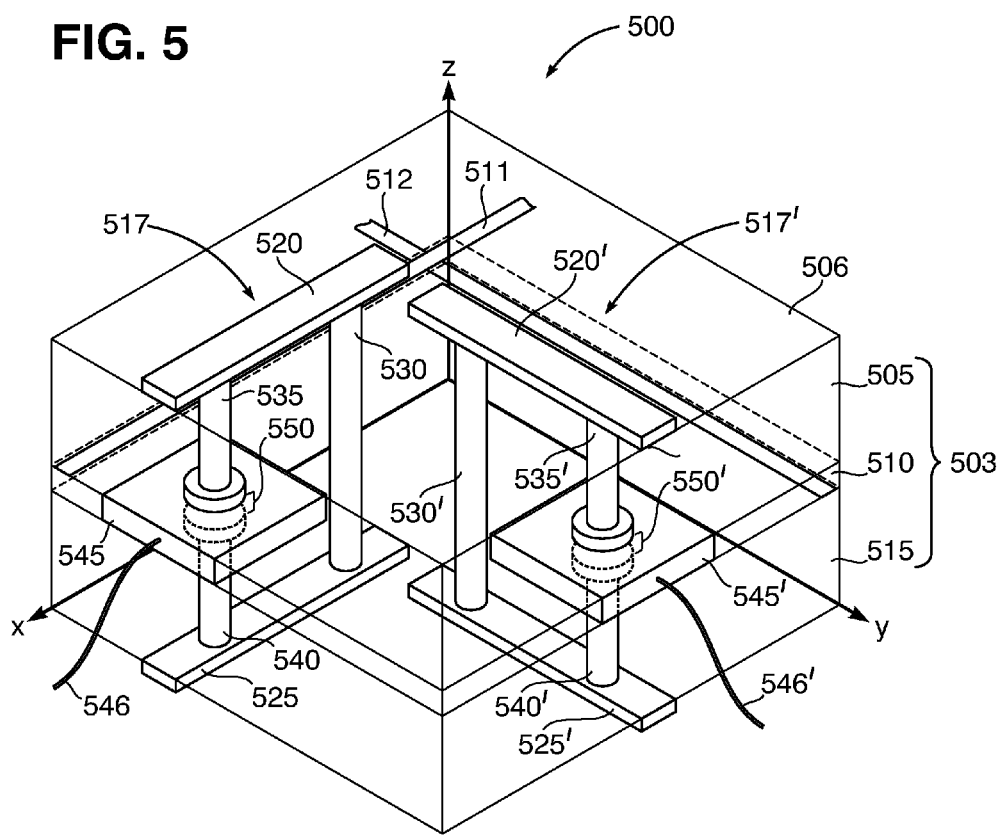

DYNAMICALLY VARIABLE METAMATERIAL LENS AND METHOD

CROSS-REFERENCE TO RELATED APPLICATIONS

This application is a continuation-in-part of U.S. patent application Ser. No. 11/504,859 filed Aug. 16, 2006, for an Actively Tunable Electromagnetic Metamaterial, incorporated herein by reference. Ser. No. 11/504,859 and this application claim the benefit of U.S. Provisional Application No. 60/713,615, filed Aug. 31, 2005, which is incorporated herein by reference.

STATEMENT OF GOVERNMENT INTEREST

The invention described herein may be manufactured and used by or for the Government of the United States of America for governmental purposes without the payment of any royalties.

BACKGROUND OF THE INVENTION

1. Field of the Invention

The invention relates to a dynamically variable lens made of an electromagnetic metamaterial. The invention also relates to a method of dynamically varying a metamaterial lens. The invention also relates to a resonance frequency tunable system.

2. Discussion of the Related Art

Lenses that operate on the visible range of the radiation spectrum are typically made of glass or plastic. Lenses made of these materials are very effective over most of the visible range. However, these materials display a small dependence on frequency or wavelength, noticed as chromatic aberration. Chromatic aberration is corrected in compound lens systems. A limited number of special lens materials are effective in the infrared range. Materials effective for terahertz range optical elements are more limited and reflective optics are often used instead of refractive lenses because of absorption effects.

Lenses can be fabricated from arrays of metallic or dielectric discs for the radio wave to microwave range. A refractive lens made from arrays of discs which operates in the short radio wave range is shown in Optics, $2^{nd}$ Edition by Eugene Hecht, p. 136 (Addison-Wesley, Reading, Mass.), incorporated herein by reference. Lenses that operate in the microwave regime can also be made of dielectric polymer materials such as Rexolite®, or Marcors®. These materials are effective over a fairly broad band; however, their use is limited because a fabricated lens is large, heavy and limited by geometry to fixed focal lengths. Other artificial dielectrics have been developed for microwave lenses, but they are typically limited in bandwidth.

Lenses made of negative refractive index (NIM) metamaterials have been demonstrated in the microwave range. A first type of lens is a plano-concave lens with a negative refractive index. This is shown in C. G. Parazzoli et al., Applied Physics Letters 84, 3232-3234 (2004), incorporated herein by reference. The lens has a refractive index of n=−1.31 at 14.7 GHz, a focal length of 5.19 cm and a radius of curvature of 12 cm. The concave lens and negative index combination acts like a convex, positive index lens. Parazzolli et al. teach that for a NIM lens to have the same focal length as a positive index lens, the NIM lens employs a larger radius of curvature, which reduces lens aberrations. Unwanted lens surface reflections can be reduced in a metamaterial lens by fitting the outer surface of the lens impedance to match that of free space. NIM lenses can have a weight advantage of a factor of approximately 10 over standard dielectric positive index lenses.

A second type of lens made of NIM material is a gradient-index or GRIN lens. The lens effect is achieved by varying the index of refraction as a function of radial position from the center of the lens. This is distinguished from a lens with a constant index of refraction material in which the thickness of the lens varies from the center to the outer edge. Negative index GRIN lenses are demonstrated by R. B. Greegor et al., Applied Physics Letters 87, 091114 (2005) and by T. Driscoll et al., Applied Physics Letters 88, 081101 (2006). Both are incorporated herein by reference.

The R. B. Greegor et al. reference shows in FIG. 1 a comparison of a GRIN lens, a plano-concave NIM lens, and a conventional positive index cylindrical piano-convex lens. T. Driscoll et al. designed and fabricated a biplanar, or geometrically flat, lens with a radially varying index gradient with the distribution as a function of radius at a point r for a lens of diameter d, described in the equation:

$$\varepsilon(r, \omega) = \mu(r, \omega) = \eta(r, w0 = -0.97 - 7.30(r/d)^2 + 0.18(r/d)^4, \quad \text{Eq. (1)}$$

wherein: $\in$ is the permittivity, $\mu$ is the magnetic permeability, and n is the negative index of refraction, each a function of angular frequency $\omega$. The first equality in Eq. (1) ensures impedance matching and therefore no reflection at the surface of the lens. The prescribed radial distribution was achieved at a frequency of 10.1 GHz. Lens diameter was 30 centimeters.

The radial distributions indicated in Eq. (1) were achieved by assembling an array of metamaterial unit cells. Each unit cell is a metamaterial split ring resonator (SRR) and wire, shaped to have a specific magnetic and electric resonance. The lens was given a radial gradient by radially positioning 50 incrementally different unit cells. The disc shaped lens produced contains one layer of metamaterial consisting of 8,000 unit cells. Approximately one-quarter of the cells were unitary, i.e. unique. Lenses constructed of both eight layers and four layers of this material were tested and shown to focus microwave radiation at 10.3 GHz, only 2% different from the design frequency. The above-cited T. Driscoll et al. reference illustrates the structure of one layer of the GRIN lens. FIG. 1 shows the split ring resonator (SRR) and wires (straps) which make up a unit cell. FIG. 1 also illustrates the array of SRRs inside a single layer of the lens.

The metamaterial NIM lenses of the prior art are only capable of operating in a very narrow band centered on a single frequency. They have a fixed focal length at the operating frequency. They do have a significant advantage over standard dielectric lenses in that they can be approximately 10 times lighter for microwave applications. They also can be designed to occupy less space than conventional lenses. This can be important for aerospace communications applications where weight and volume are of particular concern. Another advantage of NIM lenses is reduced aberration.

Inventors have discovered that problems and deficiencies associated with known lenses and materials of construction therefor can be solved or greatly reduced by the use of a dynamically variable metamaterial lens.

SUMMARY OF THE INVENTION

A dynamically variable lens includes a resonance frequency tunable electromagnetic metamaterial cell. The metamaterial cell comprises:

a substrate and a capacitance tuned split ring resonator formed on the substrate. The capacitance tuned split ring resonator includes a resonating structure having a gap and formed of an electrically conductive material. A region of photo-capacitive material is formed in close proximity to the resonating structure. The proximity is close enough such that the capacitance of the photo-capacitive material is changed and the resonance frequency of the metamaterial cell is tuned by illumination of the photo-capacitive material with at the band gap and below the band gap energy control illumination.

The focal length of the lens can be actively varied at a selected frequency. In the alternative, the frequency of the radiation on which the lens acts can be changed as a function of time. In the alternative, the index of refraction can be varied progressively across the lens from one edge to the opposite edge, to direct the radiation at an angle.

BRIEF DESCRIPTION OF THE DRAWING

FIG. 1b is a metamaterial lens that is constructed using the metamaterial of FIG. 1a.

FIG. 2a is a top view of the actively tunable split ring resonator for use in the metamaterial of FIG. 1a.

FIG. 2b is a top view of a portion of the actively tunable split ring resonator of FIG. 2a.

FIG. 2c is a side cut-away view of the actively tunable split ring resonator along line C-C of FIG. 2a.

FIG. 3a is a top view of an actively tunable split ring resonator for use in the metamaterial of FIG. 1a.

FIG. 3b is a top view of a portion of the actively tunable split ring resonator of FIG. 3a.

FIG. 3c is a side cut-away view of the actively tunable split ring resonator along line C-C of FIG. 3a.

FIG. 4 is a perspective view of a resonance frequency tunable electromagnetic metamaterial cell.

FIG. 5 is a perspective view of a resonance frequency tunable electromagnetic metamaterial cell with orthogonal split ring resonators.

Figure 1A:
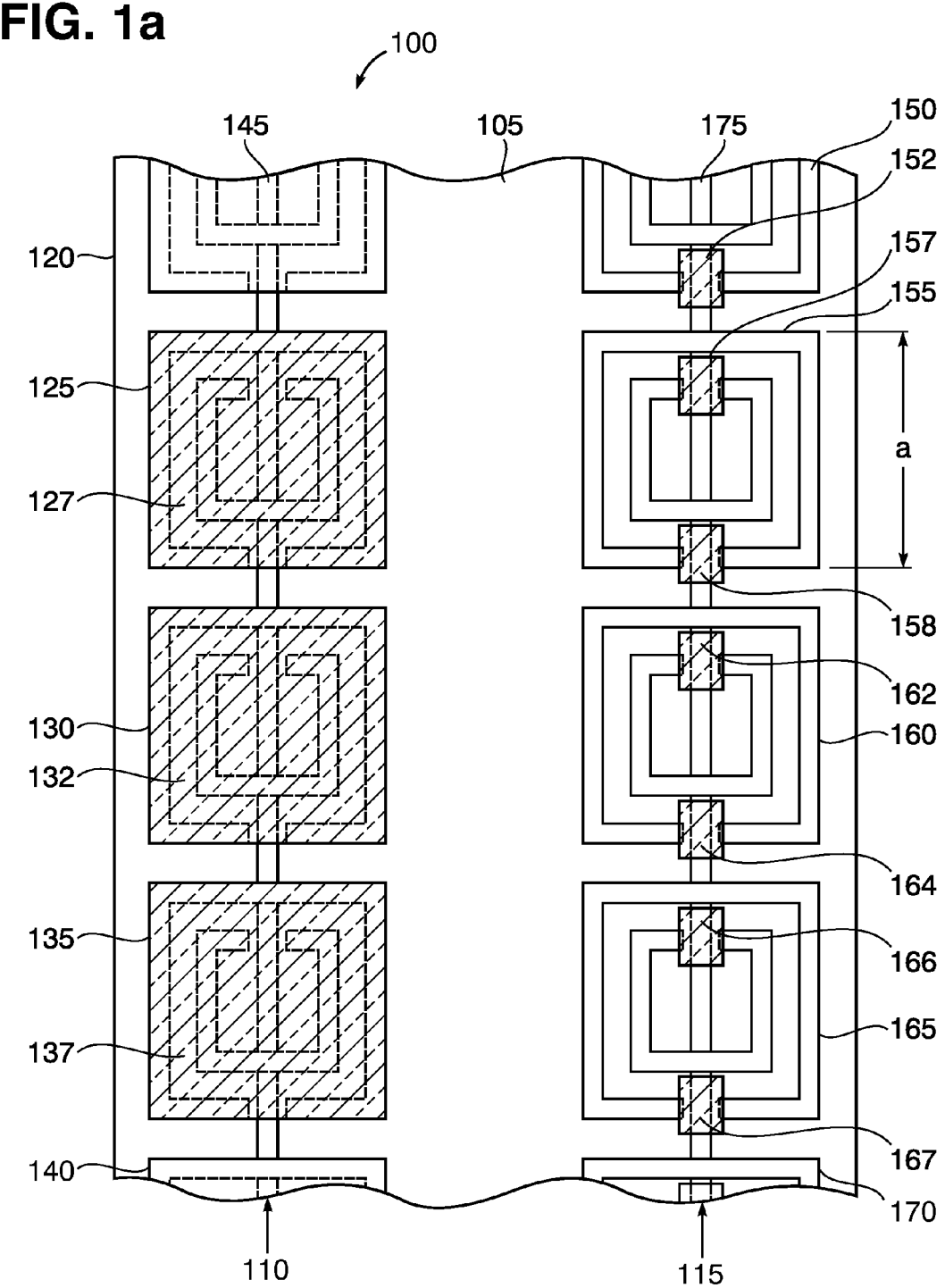
FIG. 1a is an actively tunable electromagnetic metamaterial.

The invention is described with reference to the drawing wherein numerals in the written description correspond to like-numbered elements in the several figures. The drawing discloses a preferred embodiment of the invention and is not intended to limit the generally broad scope of the invention as set forth in the claims.

DETAILED DESCRIPTION OF THE INVENTION

Lens

This invention is a dynamically variable lens made from electromagnetic metamaterial which can be actively tuned as a function of time. Considered broadly, a lens is an apparatus useful to manipulate electromagnetic radiation. The lens of the invention operates on electromagnetic radiation in a narrow frequency band selected in the range of radio frequency waves, microwaves, terahertz waves, near infrared waves, infrared waves and visible waves depending on the operating range of the constituent tunable metamaterial used. For example, the lens operates on visible electromagnetic radiation with the selection of constituent tunable metamaterial operative in the visible spectrum.

The preferred lens comprises a two or three dimensional array of split ring resonator cells. Means such as wires are provided in the cell to set dielectric permittivity. Optical wave guides provide capacitance controlling illumination to the photo-capacitive material in the split ring resonators.

The lens is controlled to dynamically reshape wave fronts of electromagnetic radiation and to direct the radiation. This is used for focusing, divergence, beam forming and the like.

The focal length of the dynamically variable lens can be rapidly altered at a particular frequency. In the alternative, the lens can be tuned to change the frequency of the radiation upon which it acts as a function of time. In a third alternative, the lens can direct the angle of impinging radiation at a desired angle by precise control of the index of refraction. The index of refraction is varied progressively across the lens from one edge to the opposite edge. The angle of the beam direction can be changed dynamically as a function of time. Other more general patterns of the index of refraction can also be dynamically imposed across the lens in order to reshape the wave fronts of the subject radiation to manipulate the radiation pattern produced by the lens in patterns which are more complex than the typical focusing, diverging, or beam forming performed by conventional lenses.

Unit cells comprising the actively tunable electromagnetic metamaterial are assembled into one or more arrays of capacitance tuned split ring resonators (SRRs). The arrays have an effective permittivity that can be adjusted and set with negative permittivity wires. The unit cells are actively tuned, switched, and/or modulated to produce a tunable effective magnetic permeability at the set permittivity. The SRRs are frequency tuned and their effective permeability in coordination with permittivity is used to control the effective index of refraction at the active frequency.

A metamaterial can have positive, negative or complex (real and imaginary) index of refraction. The tunable characteristic of the metamaterial is effected by the constituent capacitor made of a photo-capacitive material. Tuning is adjusting for resonance at a desired frequency. The capacitance of the photo-capacitive material, and therefore the resonant frequency of the RLC circuit of which it is a part, can be changed (i.e. tuned) by the controlling electromagnetic radiation. In other embodiments, materials that change inductance when exposed to controlling electromagnetic radiation are used to tune the resonant frequency of the RLC circuit. RLC circuit is a term equivalent to resonant circuit, tuned circuit or harmonic oscillator.

As shown in FIG. 1a, a metamaterial 100 includes a substrate 105 and one or more arrays 110, 115 of SRRs formed on the substrate 105. The substrate 105 may be made of a circuit board material or of other suitable materials. In one embodiment the substrate 105 is made of a photo-capacitive material. The SRRs are made from an electrical conductor, such as copper, aluminum, gold or other suitable materials. The arrays 110, 115 of SRRs are formed on the substrate using techniques known in the art. Wires 145, 175 optionally are formed on the substrate 105 in the vicinity of arrays 110, 115 using techniques known in the art. In another embodiment wires are patterned on a separate substrate. The wires are intercalated with the substrate containing the SRR patterns. In one embodiment the wires 145, 175 are formed on a side of the substrate 105 opposite from the side where the arrays 110, 115 are formed.

An array of SRRs includes multiple SRRs having one or more dimensions. The SRRs within an array are the same or may differ in size, shape, and construction. For example, one or more of the SRRs in the array may be actively tunable, and the tunable SRRs within the array may be tunable over different frequency ranges of subject radiation. The structure of each SRR may be the same or may differ. For example, an SRR structure may have a ring shape, such as a circular, curved or square ring, or may have another shape. The arrays of SRRs may be scaled in size. They are constructed using known techniques such as lithographic techniques for integrated circuit production. Various types of arrays may be combined in the metamaterial 100.

Figure 1B:
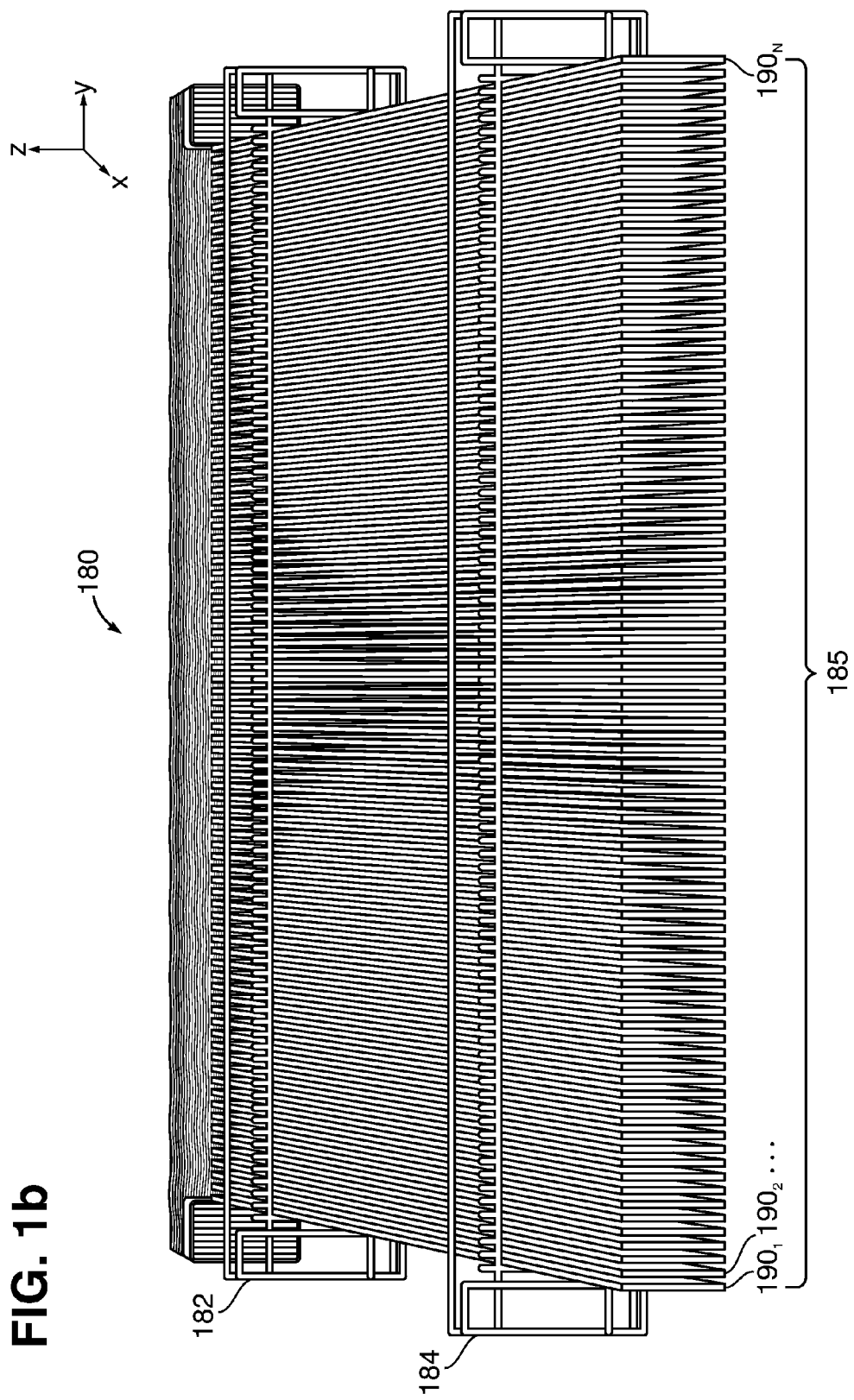

FIG. 1b shows a metamaterial lens 180 that includes a three dimensional array of SRRs. Three dimensions are shown by x, y and z axes, each with a direction arrow. Mechanical supports 182, 184 hold an integer number N of two dimensional sheets $190_1$, $190_2$, through $190_N$ in a stacked arrangement 185. The two dimensional sheets can be spaced apart by a low dielectric constant filler material instead of the mechanical supports 182, 184. The sheets $190_1$, $190_2$, through $190_N$ are spaced apart at a distance that may be constant or that may vary between adjacent pairs of sheets. The two dimensional sheets $190_1$, $190_2$, through $190_N$ each may include a two-dimensional array of SRRs and may have a construction similar to that described with respect to metamaterial 100. The two dimensional sheets $190_1$, $190_2$, through $190_N$ may have the same construction or may vary in construction.

Referring again to FIG. 1a, array 110 includes SRRs 120, 125, 130, 135, and 140. SRRs 125, 130, and 135 are actively tunable. SRR 125 includes photo-capacitive material region 127, SRR 130 includes photo-capacitive material region 132, and SRR 135 includes photo-capacitive material region 137. In FIG. 1a and as discussed with respect to FIG. 2 below, photo-capacitive material regions 127, 132, and 137 are formed over the top of and sized to cover SRRs 125, 130, and 135. Array 115 includes SRRs 150, 155, 160, 165, and 170. SRRs 150, 155, 160, and 165 are actively tunable. They are uniform in size, indicated by dimension "a" on SRR 155. SRR 150 includes one photo-capacitive region 152. SRR 155 includes two photo-capacitive regions 157, 158. SRR 160 includes two photo-capacitive regions 162, 164. And SRR 165 includes two photo-capacitive regions 166, 167. In the embodiment of FIG. 1a and as discussed with respect to FIG. 3 below, photo-capacitive regions 152, 157, 158, 162, 164, 166, and 167 are formed to fit in a gap of the corresponding SRR. SRRs 125, 130, and 135 of array 110 and SRRs 150, 155, 160, and 165 of array 115 show a number of examples of actively tunable SRRs. Other examples of actively tunable SRRs are possible.

The photo-capacitive material used in the photo-capacitive regions 127, 132, 137, 152, 157, 158, 162, 164, 166, and 167 are a semi-insulating (SI) material such as semi-insulating gallium arsenide (SI-GaAs), however, other suitable photo-capacitive materials can be used. Where SI-GaAs is used, it may either be undoped or doped to make it semi-insulating. In addition, the photo-capacitive material used may vary within an SRR or between SRRs within an array. The photo-capacitive material region(s) are provided in order to change the capacitance of the corresponding SRR when illuminated with controlling electromagnetic radiation of an appropriate wavelength. Characteristics of the controlling electromagnetic radiation, such as wavelength, intensity, and pulse temporal structure are controlled using known techniques to actively tune the capacitance of an SRR.

FIG. 2a shows a top view of actively tunable SRR 125 of FIG. 1a. SRR 125 also has dimension "a". SRR 125 is mounted on substrate 105 and includes an outer structure 205, an inner structure 210, and a photo-capacitive region 127 formed over the outer structure 205 and inner structure 210. The outer structure 205 and inner structure 210 of SRR 125 have a square shape, but other shapes may be used. In other examples, an SRR may have one structure or more than two structures. As shown, photo-capacitive region 127 is formed over the entire area of structures 205 and 210. In other examples, the photo-capacitive region is formed in different locations of the SRR.

Referring to FIG. 2b showing SRR 125, outer structure 205 includes first side portion 206a, first side portion 206b, second side 207, third side 208, and fourth side 209. There is a gap 215 of distance $G_1$ between first side portion 206a and first side portion 206b. Each side 206a, 206b, 207, 208, and 209 has a thickness and a length. Side 209 has thickness $T_1$ and length $L_1$. Inner structure 210 includes first side portion 211a, first side portion 211b, second side 212, third side 213, and fourth side 214. There is a gap 220 of distance $G_2$ between first side portion 211a and first side portion 211b. Each side 211a, 211b, 212, 213, and 214 has a thickness and a length. There is a space $S_1$ between the outer structure 205 and inner structure 210. The space may be uniform or may differ between the corresponding sides of the outer structure 205 and inner structure 210.

The dimensions of the outer structure 205 and inner structure 210 are chosen based upon parameters such as the range of wavelengths corresponding to the operating frequency band of the device. The operating frequency band includes frequencies when the photo-capacitive region is illuminated and when it is not illuminated (dark-level frequency) by the controlling electromagnetic radiation. Typically, the wavelength, λ, should be several times longer than the dimension "a" of the SRR. This relationship is used for creating a material that can be characterized by effective indices of refraction, permeability, and permittivity because many unit cells are averaged over the space of one wavelength. For example, if an SRR is to be designed to operate at approximately 10 GHz (λ=30 mm), then the dimension "a" of the outer structure 205 of the SRR may be approximately 2.6 mm such that λ>>a.

FIG. 2c shows a side cut-away view of SRR 125 along line C-C of FIG. 2a. photo-capacitive material 127 is shown on top of SRR outer structure 205 first side portion 206a, first side portion 206b, and inner structure 210 third side 213. SRR outer structure 205 first side portion 206a, first side portion 206b, and inner structure 210 third side 213 are formed on top of substrate 105. In other examples, the photo-capacitive material region 127 may extend downward to the substrate 105 to fill gaps such as the gap between outer structure 205 first side portion 206a and first side portion 206b. In some examples, the substrate 105 may be a photo-capacitive material.

FIG. 3a shows a top view of actively tunable SRR 155 of FIG. 1a. SRR 155 is mounted on substrate 105 and includes an outer structure 305, an inner structure 310, and a photo-capacitive region 157 formed in a gap of the outer structure 305 and a photo-capacitive region 158 formed in a gap of the inner structure 310. The outer structure 305 and inner structure 310 of SRR 155 have a square shape, but other shapes may be used. In other examples, an SRR may have one structure or more than two structures. As shown, photo-capacitive region 157 is formed in a gap of the outer structure 305 and a photo-capacitive region 158 formed in a gap of the inner structure 310. In some embodiments, photo-capacitive region 158 or photo-capacitive region 157 may be omitted. For example, if a device has omitted photo-capacitive material region 158 such that the inner structure gaps are not filled with photo-capacitive material, but the photo-capacitive material region 157 is maintained in outer structure gaps of the SRRs, then the device will operate at the original frequency of the inner structures and, simultaneously, at the tunable frequencies of the outer structures. In other implementations, the photo-capacitive region may be formed in different locations of the SRR. In another implementation, the SRR may be a single ring with two or more gaps.

Referring to SRR 155 in FIG. 3b, outer structure 305 includes first side portion 306a, first side portion 306b, second side 307, third side 308, and fourth side 309. There is a gap 315 of distance $G_3$ between first side portion 306a and first side portion 306b. Each side 306a, 306b, 307, 308, and 309 has a thickness and a length. For example, side 309 has thickness $T_3$ and length $L_3$. Inner structure 310 includes first side portion 311a, first side portion 311b, second side 312, third side 313, and fourth side 314. There is a gap 320 of distance $G_4$ between first side portion 311a and first side portion 311b. Each side 311a, 311b, 312, 313, and 314 has a thickness and a length. There is a space $S_3$ between the outer structure 305 and inner structure 310. The space may be uniform or may differ between the corresponding sides of the outer structure 305 and inner structure 310.

The dimensions of the outer structure 305 and inner structure 310 are chosen based upon parameters such as the wavelengths of the operating frequency band of the device, including the dark-level frequency. Again, the wavelength λ should be several times longer than the dimension "a" of the SRR. As previously discussed, this relationship is used for creating a material that can be characterized by effective indices of refraction, permeability, and permittivity because many unit cells are averaged over the space of one wavelength.

FIG. 3c shows a side cut-away view of SRR 155 along line C-C of FIG. 3a. Photo-capacitive material 157 is shown on top of substrate 105 between SRR outer structure 305 first side portion 306a and first side portion 306b. The photo-capacitive material region 157 may, for example, define an additional layer over at least a portion of the outer structure 305 and/or at least a portion of the inner structure 310. In the alternative, the substrate 105 may be doped or undoped photo-capacitive material.

FIG. 4 shows an actively tunable SRR cell 400. Three dimensions are shown by x, y and z axes and direction arrows. This SRR cell has only one split ring structure per unit cell, as compared to the nested structure SRR of FIG. 1a. The split ring 417 is supported on a substrate 403 by conductors 420 and 425 and by vias 430, 435, and 440. The term "formed on" is intended to be interpreted as shown and is not to be limited to being held upon a surface of the substrate. In FIG. 4, the substrate 403 includes first substrate layer 405, second substrate layer 410, and third substrate layer 415. The first, second and third substrate layers 405, 410, and 415 may be made of the same material or may be made of different materials. For example, the first and third substrate layers may be made of a first material and the second substrate layer may be made of a second material. The second substrate layer 410 may be fabricated with long wire arrays placed as wire pairs on either side of the second substrate layer for symmetry. This implementation takes advantage of standard circuit board fabrication techniques. In some examples, more substrate layers may be used or fewer substrate layers may be used. Other implementations may use multiple split ring structures.

The split ring 417 of SRR 400 is perpendicular to a top surface 406 of the substrate 405. A gap 450 in the split ring 417 is formed by the blind vias 435 and 440 ending at opposite sides of the second substrate layer 410. A photo-capacitive material region 445 is fabricated within a portion of the second substrate material 410 that lies within the gap 450 of the split ring 417. The photo-capacitive material region 445 may be made of materials such as undoped SI-GaAs. In another embodiment, the photo-capacitive material region 445 includes other areas such as the entire second substrate layer 410. As discussed with respect to FIG. 1a, the capacitance of the SRR cell 400 may be actively tuned by illuminating the photo-capacitive material region 445 with controlling electromagnetic radiation of the appropriate wavelength.

FIG. 5 shows an actively tunable unit cell for a metamaterial lens that is capable of interacting with both the x- and y-components of polarization of the electromagnetic radiation operated on as it propagates along the z-direction. The unit cell of FIG. 5 shows two orthogonal SRRs, each formed as described in FIG. 4. SRR 517 lies in a plane parallel to the x-z plane. Orthogonal SRR 517' lies in a plane parallel to the y-z plane. Each SRR contains a photo-capacitive material in the second substrate. The capacitive material is in or near the gap of the split ring.

FIG. 5 shows an actively tunable SRR cell 500. Three dimensions are shown by x, y and z axes and direction arrows. SRR cell 500 has two split ring structures per unit cell, one split ring 517 corresponding with split ring 417 in FIG. 4 and the other is orthogonal split ring 517'. Split ring 517 is formed on a substrate 503 by conductors 520 and 525 and by vias 530, 535, and 540. Likewise, orthogonal split ring 517' is formed in substrate 503 by conductors 520' and 525' and by vias 530', 535', and 540'. The substrate 503 includes first substrate layer 505, second substrate layer 510 and third substrate layer 515. As in FIG. 4, the first, second and third substrate layers 505, 510, and 515 may be made of the same material or may be made of different materials.

Split ring 517 and split ring 517' of SRR cell 500 are perpendicular to a top surface 506 of the substrate 505. Gap 550 in the split ring 517 and gap 550' in split ring 517' are formed by the blind vias 535, 540, 535' and 540' ending at opposite sides of the second substrate layer 510. A photo-capacitive material region 545 is fabricated within a portion of the second substrate material 510 that lies within the gap 550 of split ring 517 and gap 550' of split ring 517'. The photo-capacitive material region 545 may be made of materials such as undoped SI-GaAs.

In split ring resonator cell 500, both split ring 517 and split ring 517' are actively tuned by illuminating the photo-capacitive material region 545 with controlling electromagnetic radiation of the appropriate wavelength and intensity. The controlling radiation is guided to the regions of photo-capacitive material by optical wave guides 546 and 546' which are fiber optical wave guides or the functional equivalent. The optical wave guides transmit control illumination. Control illumination is preferably in the range of infrared light to visible light. Infrared light is more preferred. In the alternative, the optical wave guides may be patterned directly into one of the three substrates 505, 510 and 515. SRR cell 500 provides a value of effective magnetic permeability which may be either positive or negative, depending on the resonant frequency to which it is tuned in relation to the frequency of the subject radiation upon which the lens operates.

The second substrate layer 510 is fabricated with long wire arrays placed as wire pairs 511 and 512. These wires are continuous as they extend through the many repeated unit cells contained in an array of unit cells which constitute a layer of metamaterial. Wire 511 is parallel to the x-z plane and interacts with the electric field polarization component which is parallel to the x-axis. The magnetic field associated with the x-polarization interacts with the SRR that is parallel to the x-z plane. The second wire 512 is parallel to the y-z plane and interacts with the electric field component polarized along the y-axis. The magnetic field associated with the y-polarization interacts with the SRR which is parallel to the y-z plane. The long straight wires provide a negative component to the effective dielectric function. These wires are referred to in the metamaterial arts as simply "wires" or as "straight wires." Because they add a negative permittivity (dielectric) component to a cell, they can be thought of as "negative permittivity wires" or "negative dielectric wires."

The total dielectric function of the cell can be positive or negative depending on the magnitude and sign of the contributions such as from the substrate and the wires. More than one wire may be placed parallel to the x axis on either side of the split ring, or on opposite sides of the second substrate material for geometry. Any of the three substrate layers of FIG. 5 may be subdivided further into more than one layer in order to accommodate additional straight wires separated by dielectric material. Similarly, more than one wire could be parallel to the y axis and separated from all other wires by dielectric material. Such additional wires increase the negative component of the dielectric function as necessary.

Arrays are formed of multiple unit cells. Multiples of split ring resonator cell 500 are assembled in the x-y plane to produce a two dimensional array. For example, 10,000 unit cells can be assembled in the x-y plane. The cell array is made with a wire array to make the effective dielectric function more negative and with optical wave guides. The three dimensional array of tunable unit cells, each much smaller than the wavelength of the radiation on which it operates provides an effective refractive index medium which can be dynamically varied at any position within the volume. By way of example, 100 wires can be positioned in the x-direction and 100 wires can be positioned in the y-direction. Multiple two dimensional arrays in the x-y plane are stacked in the z-plane to produce a three dimensional array. For example, the stack may contain 5 to 10 x-y plane arrays. The resulting lens would include 10 unit cells.

Together, the straight wires and tunable split rings can create a negative refractive index at a particular frequency. The value of the refractive index could be varied over a range including positive and negative values for the particular operating frequency, or alternatively the operating frequency could be varied as a function of time at a given value of refractive index.

There are other geometries of metamaterials, that if used as the basis of the unit cell, will produce a similar effect to that of the split ring resonators discussed. The geometry is chosen to produce the configuration of the desired lens. For example, the unit cells of the lens shown in FIG. 5 can be modified to include a third split ring in the x-y plane. The unit cell with three split rings forms a refractive index which is effectively an isotropic material. With the addition of a third, orthogonal split ring to the cell, tuning of the metamaterial lens can be accomplished for operational radiation propagating along any of the three, x-, y- and z-directions.

The described invention for actively tuning, switching, or modulating split ring resonator arrays is based on the photo response properties of a photo-capacitive material, such as undoped semi-insulating GaAs, to controlling illumination by electromagnetic radiation such as light. This photo response changes the capacitance of the photo-capacitive material due to the redistribution of charge when the photo-capacitive material is illuminated by controlling electromagnetic radiation of the appropriate wavelength(s).

The photo-capacitance effect will now be described in more detail with respect to how it occurs and how it may be used to tune the resonant frequency of SRR cells. Although the following discussion refers primarily to undoped GaAs as the photo-capacitive material, other suitable photo-capacitive materials may be used.

Photo-capacitive materials of the invention are solid state materials. Interactions among constituent atoms and molecules cause broadening of the energy levels of electrons in outer electron shells. The electron states of these constituent atoms and molecules belong to the material as a whole rather than to any specific atom or molecule. These electron states of the material are called band states, referred to as energy bands. In a semi-conductor material, there are no allowed energy band states immediately adjacent the highest occupied state. The minimum energy separation between the highest occupied state and lowest empty state is the "band gap."

The band gap at room temperature (300° K) for some common materials is known.

| Semiconductors | |
| --- | --- |
| Sb | 0.17 eV |
| Ge | 0.67 eV |
| Si | 1.12 eV |
| GaAs | 1.43 eV |
| GaP | 2.26 eV |
| 6H—SiC | 2.9 eV |
| GaN | 3.5 eV |

| Insulators | |
| --- | --- |
| $Ta_2O_5$ | 4.2 eV |
| $TiO_2$ | 5.0 eV |
| $Si_3N_4$ | 5.1 eV |
| $Al_2O_3$ | 5 eV |
| $SiO_2$ | 8.0 eV |

Undoped SI-GaAs is grown by the liquid-encapsulated Czochralski method. This is a commonly used commercial process for bulk material. Alternate methods may also be used. GaAs contains naturally occurring deep-level donor defects, that is, atoms with a higher chemical valence energy than the host and thus are able to give up or donate electrons to the system. The dominant native point donor defect is associated with the EL2 (electron level 2) state which is believed to be due to a substitutional defect in which an As atom occupies what would normally be a Ga site in the lattice, i.e. the As antisite. GaAs has a band gap of 1.424 eV at room temperature (300° K). Since the defects are deep level donors, but exist slightly below mid-gap, it is energetically favorable for their excited state ($EL2^+$) to compensate any shallow acceptors, atoms with a lower chemical valence energy than the host and thus are able to take or accept electrons from the system; the acceptors lying just above the valence band (VB).

The shallow acceptors are unintentional impurity atoms, typically carbon, and are a result of the growth process. The acceptors may also be intentionally introduced impurity atoms. If the density of deep donors, $N_{dd}$, is larger than the density of the shallow acceptors, $N_{sa}$, this compensation process essentially freezes out the thermal excitation of electrons from the valence band (VB) to the vacant states in the acceptors. Any holes, i.e. absence of electrons, in the valence band (VB) are a result of the thermal excitation of electrons from the valence band (VB) into the conduction band (CB). In addition, because $N_{dd} N_{sa}$, there will be some thermally excited electrons in the conduction band (CB) from the donors. Overall, there will be more electrons in the conductance band (CB) than holes in the valence band (VB) and the material is slightly n-type, meaning that conduction mostly is done by the negatively charged electrons, i.e. the majority carriers. The density of intrinsic free carriers is $n_i=2\times10^6$ cm$^{-3}$, a value that is characteristic of a semi-insulator. Thus, this material is referred to as semi-insulating (SI). This material overall is suitable for low-loss capacitor formation.

When a metal is brought into intimate contact with a semiconductor, the Fermi levels must line up to establish thermal equilibrium. The contact between the metal and semiconductor forms one of two basic types of junctions. The first type of junction is known as an ohmic contact. The second type of junction is known as a Schottky junction, or a variation thereof. A Schottky junction is formed from a Schottky barrier, which blocks the flow of current in one direction (except for a small amount of leakage current) while allowing current to flow in the other direction. That is, the Schottky junction is a diode.

When the diode is in a state where current cannot flow, a region exists in the diode near the metal that is depleted of free majority-carrier charge. This is known as a depletion region. The depletion region generally is filled with fixed charge left from ionized impurities. When the boundary at the edge of the depletion region in the semiconductor moves, more or less of the fixed ion charge is exposed. Thus, a change in capacitance occurs according to the equation:

$$\Delta C = \Delta(Q/V). \quad \text{Eq. (2)}$$

The symbol $\Delta$ means "change in", C is the capacitance, Q is the charge, and V is the intrinsic voltage across the capacitor.

Q can be changed in three ways: 1) by thermal excitation, 2) by voltage applied across the region, and 3) by optical excitation. For typical doped semiconductors with intentional impurities with electronic levels very close to the band edges, the states tend to already be fully ionized at room temperature. Therefore, a small change in capacitance is observed optically. However, a change in capacitance is observed due to a change in voltage with the approximate proportional relationship $C \partial V^{-1/2}$. In the case of an undoped photo-capacitive material, the material has deep level states that are not fully ionized at room temperature. Thus, the charge on these states can be manipulated optically to increase the rate of ionization. The net change in charge changes the capacitance. The theoretical relationship between the optical flux density and the change in capacitance is well known.

The charge distribution in the capacitor, and therefore the capacitance, can be modified by illuminating the GaAs with a probe light of controlling electromagnetic radiation of the appropriate wavelength or energy in order to modify the charge state population of the electron level 2 (EL2) deep donor states. Electron level 2 (EL2) is the dominant native point defect as compared to other levels such as electron level 3 (EL3) and electron level 4 (EL4). The most active state change in electron level 2 (EL2) is from a neutral charge state EL(0) formed by electron occupation to the EL2(+1) charge state formed when an electron is stimulated into the conduction band (CB). An energy of 0.684 eV (1.424 eV-0.74 eV) is required for this excitation at room temperature. The value of 0.74 eV is the accepted energy level value of EL2(0) with respect to the valence band (VB) at 300° K. For example, see D. C. Look and Z. Q. Fang, "On the energy level of EL2 in GaAs," Solid-State Electronics 43 (1999), at pages 1317-1319. Also a discussion of energy level diagrams is provided in P. Omling, P. Silverberg, and L. Samuelson, "Identification of a second energy level of EL2 in n-type GaAs," Phys. Rev. B38, pages 3606-3609 (1988), incorporated herein by reference.

A depletion region (capacitance) can exist even without an applied voltage. For an ideal semiconductor, the depth of this depletion region at zero volts can be controlled by the work function of the metal contact in relationship to that of the semiconductor. However, GaAs typically has a high level of surface states that pin the Fermi level, causing the difference between the metal and GaAs work function to remain relatively constant. The density of surface states may be reduced by, among other things, using surface treatments such as chalcogen elements.

Common metals used with GaAs include aluminum, gold and copper. For some metals, such as copper, it is desirable to use a diffusion barrier to prevent the metal from diffusing into the GaAs. A barrier for copper can be formed from many materials, including Ba or $BaF_2$. For gold, it is common to use an under-layer of chromium as the diffusion barrier. Other metals and barriers are possible.

Another way to control the "dark-level" capacitance is to use an insulating layer between the photo-capacitive material and the metal. This layer functions as a capacitance in series with the photo-capacitance, which reduces the net effective capacitance and thereby controls it. The addition of the insulating layer also enhances efficiency because it blocks leakage current that might otherwise flow. Generally, it is beneficial to reduce the number of surface states in GaAs for this application of an insulator.

In the metamaterial, when there are two metal electrodes there will typically be two depletion regions. This can be modeled as a series configuration of a capacitor-resistor-capacitor, where the resistor is from the conductivity of the bulk photo-capacitive material in the volume not occupied by, and generally between, the depletion regions which form the photocapacitors.

Method

Tuning is adjustment for resonance at a desired frequency. Tuning of the split ring resonators is described with reference to the equation:

$$n(\omega) = \pm[\in(\omega)\mu(\omega)]^{1/2}, \quad \text{Eq. (3)}$$

wherein: n is refractive index as a function of angular frequency $\omega$. $\in$ is permittivity and $\mu$ is magnetic permeability. When both $\in(\omega)$ and $\mu(\omega)$ are negative, the negative sign (−) is used in equation 3 and $n(\omega)$ is negative. The cell substrate provides the base value of permittivity. The split ring resonators can also contribute to permittivity C. Additional negative permittivity C is provided, if required, by the straight wires. However, the split ring resonators primary contribution is to permeability $\mu$ and they are actively tuned by means of capacitance controlling illumination. Control illumination in infrared to visible wavelengths is provided by the optical wave guides. The split ring resonators can be tuned to control negative refractive index at a particular frequency. The value of the refractive index can be varied over a range including positive and negative values for a selected operating frequency. In the alternative, the operating frequency can be controlled as a function of time at a selected refractive index.

The dynamically variable lens made from actively tunable electromagnetic metamaterial can be controlled to rapidly alter its focal length at a particular frequency, or it can change the frequency of the radiation it acts on as a function of time. The lens can be controlled to precisely vary the index of refraction progressively across the lens from one edge to the opposite edge to cause the radiation to be directed at an angle. The angle of the beam direction can be changed dynamically as a function of time. Other more general patterns of the index of refraction can also be dynamically imposed across the lens in order to reshape the wave fronts of the subject radiation to manipulate the radiation pattern produced by the lens in ways which are more complex than the typical focusing, diverging, or beam forming performed by conventional lenses.

Figure 8A:
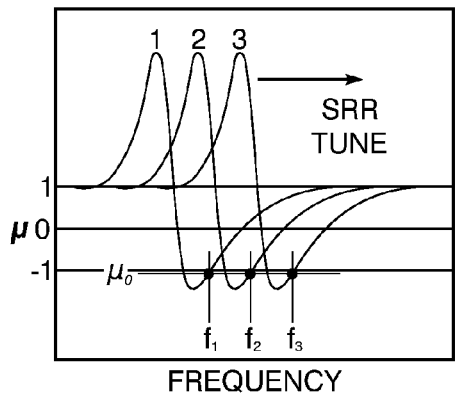
FIG. 8a and FIG. 8b are plots of permeability versus frequency for a tunable metamaterial.

Varying the operational frequency of the lens at constant focal length is illustrated in FIG. 8a. The lens permeability μ is plotted against frequency. In FIG. 8a the SRR is tuned to resonate at three different frequencies. The intensity of controlling radiation is changed to produce three resonance curves (1, 2, 3) corresponding to three possible frequencies of electromagnetic radiation on which the lens operates ($f_1$, $f_2$, $f_3$). A frequency ($f_1$, $f_2$ or $f_3$) is selected on one of the three resonance curves (1, 2, 3) that coincides with a fixed permeability $\mu_0$. As a result, the frequency of the radiation f on which the lens operates is varied as a function of time and the focal length of the lens remains constant.

Figure 8B:
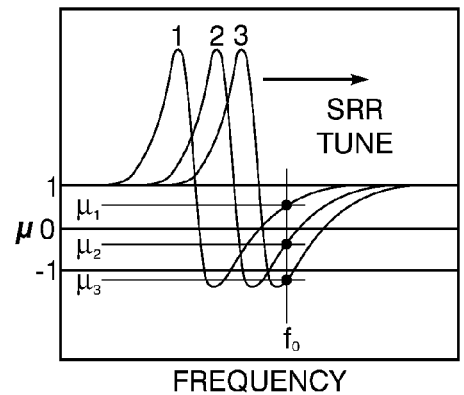

Varying the focal length of the lens at constant operational frequency is illustrated in FIG. 8b. The frequency of the radiation the lens operates on is $f_0$, a constant. The intensity of controlling radiation is changed to tune to three SRR resonance curves (1, 2, 3) versus frequency. A permeability ($\mu_1$, $\mu_2$, $\mu_3$) is selected on one of the resonance curves that coincides with a constant operational frequency $f_0$. As a result the focal length of the lens is varied while maintaining a fixed operational frequency.

In order to further illustrate the tuning shown in FIG. 8a, attention is drawn to the GRIN lens in FIG. 1 of the T. Driscoll et al. reference. At a frequency $f_1$, the lens has a negative refractive index profile varying radially as shown in Eq. 1 above. At each radial position r, the refractive index profile is related to the permittivity (dielectric function) ∈ and magnetic permeability μ according to the equation:

$$n(r,\omega_1) = -[\in(r,\omega_1)\mu(r,\omega_1)]^{1/2}, \quad \text{Eq. (4)}$$

wherein: n is refractive index and $\omega_1 = \cdot 2\pi f_1$. For NIM, the negative sign (−) indicates:

∈<0 and μ<0.

This refractive index profile gives the desired focal length of the GRIN lens to operate on radiation of frequency $f_1$.

The frequency of the radiation on which the lens operates can be changed at constant focal length by tuning the split ring resonators. This shifts the frequency of the effective permeability such that $\mu(r,\omega_2) = \mu(r,\omega_1)$, maintaining a constant focal length. In FIG. 8a, the GRIN lens has a unit cell at a position, radius $r_1$, with magnetic permeability $\mu_0 = \mu(r_1,\omega_1)$ at frequency $f_1$ on curve 1. Next, the resonant frequency of the unit cell is tuned to follow curve 2, so that the permeability $\mu_0$ occurs at frequency $f_2$ at the same position, radius $r_1$. Similarly, each unit cell in the lens is tuned to a new angular frequency of operation $\chi_2 = 2\pi f_2$ while holding the original permeability $\mu(r,\Omega_2) = \mu(r,\omega_1)$ constant for each value of r. As a result, the operational frequency of the lens is changed at constant focal length. Again, the unit cell is adjusted to operate at a third frequency, $f_3$ on curve 3.

FIG. 8b shows how the focal length of the GRIN lens is changed as a function of time while operating on the radiation having a given fixed frequency $f_0$. As in FIG. 8a, a unit cell at a position, radius $r_1$, contains a split ring resonator tuned to follow frequency curve 1 and has a permeability $\mu_1 = \mu(r_1,\omega_0)$, at angular frequency $\omega_0 = 2\pi f_0$. The permeability of the unit cell is changed to $\mu_2$ at fixed frequency $f_0$ by tuning the SRR to follow curve 2. Similarly the permeability of the particular unit cell's SRR is changed to a third value $\mu_3$ the fixed frequency $f_0$ on curve 3. By tuning all the SRRs in all the unit cells of the GRIN lens in the same way, the focal length of the lens can be changed as it operates on the radiation of fixed frequency $f_0$.

In a third mode of operation, index of refraction is varied progressively across the GRIN lens from one side to the opposite side causing the beam (of frequency $f_0$) to be steered. This can be done dynamically as a function of time by a similar method illustrated in FIG. 8b. By combining the methods of FIG. 8a and FIG. 8b, more than one frequency can be steered by dynamically switching alternately between the frequencies.

A pattern of refractive index can be dynamically imposed on the GRIN lens by tuning the SRRs in order to reshape the wave front of the subject radiation in any complex pattern desired as it transits the lens. These patterns can be more complex than the typical focusing, diverging, or beam forming performed by conventional lenses. Reshaping of wave fronts can be done rapidly as a function of time following the description of FIG. 8a and FIG. 8b.

By incorporating a photo-capacitive material into the resonant structures and directing controlling electromagnetic radiation of the appropriate wavelength to the photo-capacitive material, the capacitance of the resonant structure can be controllably varied. The controlling radiation is varied by choice of one or more of: 1) wavelength, 2) intensity, and 3) time structure of the controlling electromagnetic radiation pulses.

The dimension and placement of the photo-capacitive material also can be chosen so that the combined split ring and photo-capacitive material will resonate at the desired frequency. Photo-capacitive material can be incorporated either in series or in parallel with the capacitance of the split ring, depending on the magnitude of the change desired and the particular geometry of the split ring. The geometry of the split ring structures can be adjusted to compensate for the presence of the un-illuminated photo-capacitive material. For example, inductance of the resonator and capacitance can be modified independently.

Magnetic permeability p is a characteristic physical property of a material proportional to the magnetic inductance produced in the material divided by the magnetic field strength. Relative permittivity E is the dielectric constant of a material.

Split ring resonator (SRR) cells can be designed to produce negative effective magnetic permeability $\mu_{\text{eff}}$ in a fixed, narrow frequency band. An SRR made of a circuit of conducting trace or wire with a gap functions analogously to an RLC circuit. i.e. a resonant circuit consisting of a resistor (R), an inductor (L), and a capacitor (C) connected in series. The SRR is a tuned circuit or harmonic oscillator resonating at a particular frequency. The physical dimension "a" of the SRR is such that a<<λ, where λ is the wavelength of the electromagnetic radiation operated on.

Periodic arrays of SRR cells are combined with periodic arrays of straight wires which contribute an effective relative electric permittivity $\in_{\text{eff}}$ (dielectric constant) that can be designed to have specific values in a frequency band of interest. The quantities $\in_{\text{eff}}$ and $\mu_{\text{eff}}$ are the relative permittivity and permeability. The actual values are obtained by multiplying $\in_{\text{eff}}$ and $\mu_{\text{eff}}$ by the vacuum values of $\in_0$ and $\mu_0$ respectively. In Rationalized MKS (meter, kilogram, second) units, the permittivity of free space is $\in_0 = 8.8542 \times 10^{-12}$ farad/meter and the permeability of free space is $\mu_0 = 1.2566 \times 10^{-6}$ henry/ meter. The combined effective permittivity and permeability result in an effective index of refraction, $n_{eff}$, where:

$$n_{eff} = (\epsilon_{eff} \mu_{eff})^{1/2}. \qquad \text{Eq. (5)}$$

$n_{eff}$ can have values not producible by naturally occurring materials or blends of naturally occurring materials In particular, if $\epsilon_{eff}$ and $\mu_{eff}$ are both negative then $n_{eff}$ will be negative.

Materials having a negative $n_{eff}$ are referred to as left-handed materials or negative index materials. These materials have remarkable properties. For example, the direction of refraction is opposite that of normal materials and the Doppler effect shifts frequencies in the opposite direction compared to normal materials. In general, these engineered electromagnetic materials are referred to as electromagnetic metamaterials.

The special electromagnetic properties of the metamaterial result primarily from its geometrical structure. The structure enables the active tuning, switching, or modulating of the electromagnetic response versus frequency of a metamaterial to have a specified electric permittivity $\epsilon_{eff}$ (dielectric constant) and effective magnetic permeability $\mu_{eff}$. This capability enables a new range of values for these electromagnetic properties and for the resulting effective index of refraction $n_{eff}$. For example, if $n_{eff}$ is negative (negative index) a lens containing the material can be made to allow impinging electromagnetic radiation to be manipulated in ways not possible with glass and dielectric polymer materials.

Tuning, especially for $\mu_{eff}$, is operable over a wide range of radiation frequencies, including radar or below to visible light or above. As a result of tuning, switching, and/or modulating of the metamaterial with controlling electromagnetic radiation, no additional conducting circuit is needed. The absence of additional control circuitry is a benefit because it might affect or interfere with the electromagnetic behavior of the metamaterial. Furthermore, there are no moving mechanical parts, such as micro-electromechanical switches (MEMS) required to achieve the tuning, switching, or modulation. The system is flexible so that micro-electromechanical switches can be added if it enhances the utility.

The described metamaterial has a very low percentage of metal by weight and is relatively light. The size of unit cells of the metamaterial typically are much less than the wavelength of the radiation it is designed to propagate, thus lenses formed from such metamaterial are relatively compact and light weight.

The described techniques may be implemented with a variety of photo-capacitive materials. In one implementation, semiconductor materials such as GaP with a band gap of approximately 1.35 eV and greater may be used. Also, other dopants may be substituted for the deep level donors. For example, a copper dopant in GaAs acts as a deep level trap. In some uses, contacts made of gold, aluminum, or other suitable materials may be used in place of copper contacts.

In another embodiment, the photo-capacitive material may instead be a photo-reactive material that changes capacitance and/or inductance when exposed to controlling electromagnetic radiation. In this embodiment, the RLC circuit is tuned by changing the value or the capacitance, the inductance, or both the capacitance and the inductance.

The controlling electromagnetic radiation may have a variety of wavelengths such as, for example, wavelengths from the near infrared to the visible, depending on the specific geometry, the photo-capacitive material deep level trap energy levels in relation to the valence band (VB) or conduction band (CB) edge, as well as the wavelengths of the operating band of the electromagnetic metamaterial.

System

Figure 9:
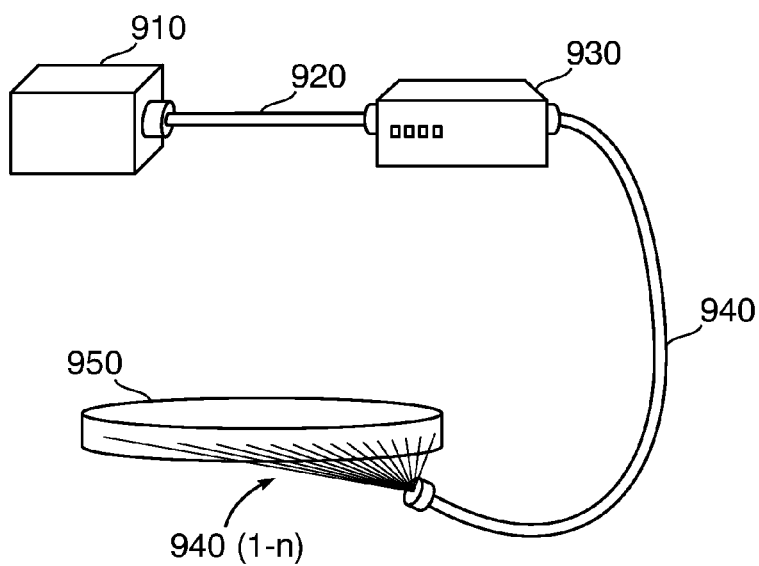
FIG. 9 is a schematic arrangement of a dynamically variable metamaterial lens system.

The invention is also a resonance frequency tunable system. FIG. 9 shows a dynamically variable metamaterial lens system. A source of controlling radiation 910 provides one or more wavelengths of electromagnetic radiation. The wavelengths are typically in the infrared and below the band gap of the semi insulating material used in the tunable SI-GaAs SRR. The electromagnetic radiation is transmitted by fiber optical wave guide bundle 920 to an electro-optical modulator 930. The electro-optical modulator 930 controls the intensity of the controlling radiation as a function of time. An optical wave guide such as fiber optical wave guide bundle 940 comprises individual optical fibers 940(1-n). The individual optical fibers 940(1-n) are independently selectable by means of electro-optical modulator 930. Each individual optical fiber 940(1-n) is in communication with one or more unit cells in the dynamically variable metamaterial lens 950. Each unit cell includes a split ring resonator (SRR). Dynamically variable metamaterial lens 950 has arrays of tunable SRRs and straight wires, including embedded optical wave guides internal to the lens assembly.

In the resonance frequency tunable system the controlling electromagnetic radiation is modulated or switched by a separate electro-optical system (modulator) separate from the metamaterial. The modulator may be coupled to the photo-capacitive material sites in the metamaterial by, for example, fiber optical wave guides. In this case, different sections of the metamaterial array may be adjusted to have a different index of refraction. Such an approach may be used to produce a lens of tunable metamaterial that has a variable focal length as a function of time and frequency of the subject electromagnetic radiation to be focused. Such a controllable metamaterial also may be used, for example, as a beam director by adjusting the beam phase across the beam's wave front in a manner similar to the lens.

A number of methods are used to guide the controlling electromagnetic radiation to the individual SRRs for tuning or controlling the metamaterial. In one implementation, the controlling electromagnetic radiation travels through a suitable material used as the substrate 105 for an SRR array, as shown in FIG. 1a. In another implementation, the controlling electromagnetic radiation travels through a suitable material used as the second substrate material 410, as shown in FIG. 4. In still another implementation, the controlling electromagnetic radiation may be guided to the photo-capacitive material by optical wave guides embedded in the dielectric material forming the substrate for the SRR arrays. Wave guides also may be formed directly in the dielectric substrate. These variations are used alone or in combination, depending on such factors as, the geometry of the metamaterial array structure, the subject radiation wavelength at which the device employing the metamaterial operates and the wavelength of the controlling electromagnetic radiation used.

The invention is shown by way of Example.

Example 1

Figure 6:
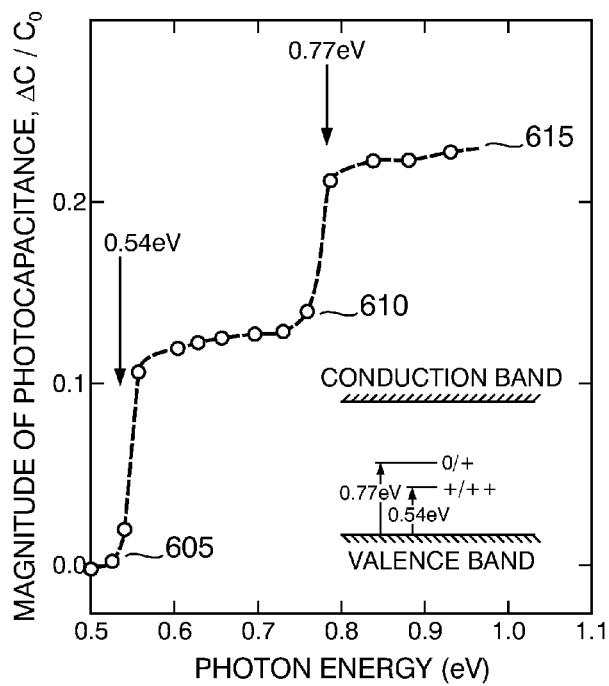
FIG. 6 is a low temperature spectrum for GaAs of steady state photo-capacitance versus energy of the illuminating photons.

FIG. 6 shows a photo-capacitance spectrum of steady state photo-capacitance for GaAs measured at 77° K. Illuminating photon energy was plotted against magnitude of photo-capacitance. Three distinct levels (605, 610, 615) are shown, one for each charge state of EL2. These are localized states with discrete energy levels. The energies are referenced to the valence band. It was noted that the 0.77 eV value was within the range of experimental error of the accepted value of 0.73 eV at 77° K. Excitation of electrons from the valence band was used to reduce the EL2 energy level excitation states. The band gap for GaAs is 1.424 eV (λ=0.89 μm) at 300° K. The band gap energy is the energy required to excite an electron from the valence band to the conduction band in FIG. 6. For the first type of EL2 transition with threshold energy of 0.54 eV (λ=2.3 μm), an electron is excited into an EL2(++) state, forming EL2(+) and there is a 10% change in capacitance. For the second type of transition at 0.77 eV (λ=1.6 μm), an electron is excited into an EL2(+) state, forming EL2(0), and there is an additional 10% change in relative capacitance for this particular experiment. A more detailed discussion is provided in J. Lagowski, D. G. Lin, T. P. Chen, M. Skowronski, and H. C. Gatos, "Native hole trap in bulk GaAs and its association with the double-charge state of the arsenic antisite defect", Appl. Phys. Lett. 47, pages 929-931 (1985), which is the source of the data shown and discussed with respect to FIG. 6.

Example 2

Figure 7:
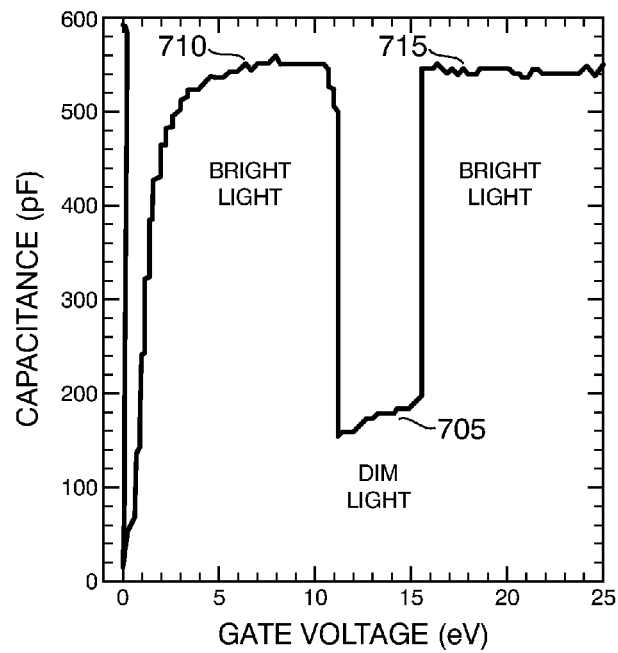
FIG. 7 is a diagram of the effect of light intensity on the capacitance of semi-insulating GaAs.

FIG. 7 shows the effect of varying the intensity of the controlling electromagnetic radiation on the capacitance of an undoped SI GaAs filled capacitor. Gate voltage was plotted versus capacitance. A tungsten lamp was the source of the controlling electromagnetic radiation. The lamp produced a broad spectrum ranging from the infrared to visible light. There was about a 200% change in capacitance between the value in the region 705 labeled "dim light" and the value in the regions 710, 715 labeled "bright light." As the level of the controlling electromagnetic radiation was varied, the gate voltage was varied linearly with time. As shown, the capacitance was essentially independent of gate voltage above approximately 5 eV. Typical capacitances for this type of experiment were found to range from 0.035 pF/mm$^2$ to 0.118 pF/mm$^2$ for a 1 mm thick undoped SI-GaAs sample.

Example 3

An SRR was constructed according to FIG. 1a. The total inductance of the SRR was calculated to be: $L_{tot}$=4.9 nano-Henries. The measured resonance frequency was: f=11 GHz. The formula:

$$f=1/2\pi(L_{tot}C)^{1/2},\qquad\text{Eq. (6)}$$

yielded C=43 femto-Farads for the capacitance of the outer SRR only, for simplicity, neglecting any effects of the inner structure. In this case, a change of capacitance ΔC=8.6 femto-Farads yields a 1.1 GHz reduction in resonant frequency. Similarly, an SRR was constructed according to FIG. 4, the total inductance was $L_{tot}$=5.8 nano-Henries and the resonant frequency was f=8.5 GHz. This gave a capacitance of C=61 femto-Farads. Thus a shift of 10% in frequency requires a 20% change in capacitance, or ΔC=12 fF. It is apparent that capacitive tuning concept can be scaled to other wavelengths.

Example 4

Prophetic (Preferred Embodiment)

A dynamically variable lens is made by replacing the piano-concave metamaterial lens disclosed in C. G. Parazzoli et al., Applied Physics Letters 84, 3232-3234 (2004), FIG. 1 with the actively tunable electromagnetic metamaterial lens. The split ring resonators (SRR) shown in the unit cell of FIG. 1 are replaced by the tunable SRRs containing semi-insulating GaAs shown in the instant FIGs. 1a, 2a-c, and 3a-c.

In the dynamically variable lens, the SRRs are tuned by illuminating the SI-GaAs with controlling electromagnetic radiation which is brought to the SI-GaAs on each individual SRR by fiber optical wave guides, or alternatively by wave guides patterned directly into the central layer of dielectric material labeled 410 in the instant FIG. 4.

Example 5a

Prophetic (Preferred Embodiment)

A dynamically variable lens is made by replacing the SRRs in the metamaterial GRIN lens of T. Driscoll et al., Applied Physics Letters 88, 081101 (2006), FIG. 1, with tunable SRRs shown in the instant FIG. 4.

Example 5b

Prophetic (Preferred Embodiment)

Several two dimensional arrays of unit cells as described in FIG. 5 are stacked to form a dynamically variable metamaterial lens which interacts with both the x- and y-components of polarization of a subject radiation. This lens is tuned and the results compared with the non-tunable metamaterial lens of T. Driscoll et al. which operates effectively on only one radiation polarization.

The foregoing discussion discloses and describes embodiments of the invention by way of example. One skilled in the art will readily recognize from this discussion, that various changes, modifications and variations can be made therein without departing from the spirit and scope of the invention as defined in the following claims.

What is claimed is:

1. A dynamically variable lens comprising an array of resonance frequency tunable metamaterial cells arranged in two or three dimensions, each metamaterial cell including:
   a substrate and a capacitance tuned split ring resonator formed on the substrate, wherein:
   the capacitance tuned split ring resonator includes a structure having a gap and formed of an electrically conductive material and a region of photo-capacitive material formed in close proximity to the structure such that the capacitance of the photo-capacitive material is changed and the resonance frequency of the metamaterial cell is thereby tuned by control illumination of the photo-capacitive material with at the band gap and below the band gap energy.

2. The dynamically variable lens of claim 1 wherein in the metamaterial, the photo-capacitive material comprises semi-insulating GaAs.

3. The dynamically variable lens of claim 1, comprising an array of resonance frequency tunable metamaterial cells arranged in two dimensions.

4. The dynamically variable lens of claim 1, comprising an array of resonance frequency tunable metamaterial cells arranged in three dimensions.

5. The dynamically variable lens of claim 1, wherein the resonance frequency tunable metamaterial cell comprises two orthogonal split ring resonators.

6. The dynamically variable lens of claim 1, wherein the resonance frequency tunable metamaterial cell comprises three orthogonal split ring resonators.

7. The dynamically variable lens of claim 1, wherein the resonance frequency tunable metamaterial cell comprises negative dielectric means.

8. The dynamically variable lens of claim 1, wherein the resonance frequency tunable metamaterial cell comprises wires.

9. The dynamically variable lens of claim 1, comprising an array of resonance frequency tunable metamaterial cells with wires extends through the cells.

10. The dynamically variable lens of claim 1, wherein the cell comprises an optical wave guide in photo communication with the photo-capacitive material.

11. A method of dynamically varying a lens comprising:
  (a.) providing a resonance frequency tunable electromagnetic metamaterial, the metamaterial comprising
    a substrate; and
    an array of split ring resonators formed on the substrate, wherein:
    at least one of the split ring resonators comprises a capacitance tuned split ring resonator, the capacitance tuned split ring resonator including a structure having a gap and formed of an electrically conductive material and a region of photo-capacitive material formed in close proximity to the structure;
  (b.) illuminating the photo-capacitive material with at the band gap and below the band gap electromagnetic control radiation having a selected range of wavelengths; and
  (c.) by means of the photo-capacitive effect, tuning the metamaterial with the control electromagnetic radiation.

12. The method of claim 11, tuning is accomplished by varying intensity of control electromagnetic radiation to change the operating frequency of the lens and selecting frequencies at a constant value of permittivity to control the frequency of electromagnetic radiation the lens operates on at a constant lens focal length.

13. The method of claim 11, wherein tuning is accomplished by varying intensity of control electromagnetic radiation to change the operating frequency of the lens and selecting permittivity values at a constant frequency to focus the lens at the constant frequency.

14. The method of claim 11, wherein index of refraction is controlled by the combination of setting permittivity and adjusting permeability.

15. The method of claim 11, wherein the electromagnetic control radiation is at the band gap energy.

16. The method of claim 11, wherein the electromagnetic control radiation is below the band gap energy.

17. The method of claim 11, additionally comprising:
setting the permittivity of the lens.

18. The method of claim 11, additionally comprising:
providing wires in the substrate and setting a negative permittivity of the lens therewith.

19. The method of claim 11, wherein the photo-capacitive material comprises semi-insulating GaAs.

20. The method of claim 11, additionally comprising,
directing radiation on which the lens operates onto the lens, the radiation on which the lens operates selected from the group consisting of radio waves, microwaves, terahertz waves, near infra red waves, infra red waves and visible waves.

21. A resonance frequency tunable system including:
(a.) a dynamically tunable lens comprising an electromagnetic metamaterial comprising:
  a substrate and an array of split ring resonators formed on the substrate, wherein:
  at least one of the split ring resonators comprises a photo-capacitance tuned split ring resonator including an electrically conductive structure and a region of photo-capacitive material formed in close proximity to the structure;
(b.) a source of at the band gap and below the band gap energy electromagnetic radiation in the range of radio frequency waves to visible frequencies and an electro-optical modulator controlling the at the band gap and below the band gap energy electromagnetic radiation therefrom; and
(c.) an optical wave guide illuminating the photo-capacitive material with electromagnetic radiation from the source and electro-optical modulator.

22. The system of claim 21 wherein the electro-optical modulator controls wavelength of band gap energy electromagnetic radiation.

23. The system of claim 21 wherein the electro-optical modulator controls wavelength of at the band gap and below the band gap energy electromagnetic radiation.

24. The system of claim 21 wherein the electro-optical modulator controls intensity of at the band gap and below the band gap energy electromagnetic radiation.

25. The system of claim 21 wherein the electro-optical modulator controls temporal structure of at the band gap and below the band gap energy electromagnetic radiation pulses.

26. The system of claim 21 wherein the electro-optical modulator controls at the band gap energy electromagnetic radiation.

27. The system of claim 21 wherein the electro-optical modulator controls below the band gap energy electromagnetic radiation.

* * * * *